United States Patent
Speer et al.

(10) Patent No.: US 7,504,045 B2
(45) Date of Patent: Mar. 17, 2009

(54) METHOD OF TRIGGERING A FILM CONTAINING AN OXYGEN SCAVENGER

(75) Inventors: Drew Ve Speer, Simpsonville, SC (US); Frank Bryan Edwards, Simpsonville, SC (US); Scott William Beckwith, Greer, SC (US); Janet Rivett, Simpsonville, SC (US); Thomas Duane Kennedy, Simpsonville, SC (US)

(73) Assignee: Cryovac, Inc., Duncan, SC (US)

( * ) Notice: Subject to any disclaimer, the term of this patent is extended or adjusted under 35 U.S.C. 154(b) by 597 days.

(21) Appl. No.: 11/146,848

(22) Filed: Jun. 7, 2005

(65) Prior Publication Data

US 2006/0276368 A1    Dec. 7, 2006

(51) Int. Cl.
*B29D 22/00* (2006.01)
*B32B 27/16* (2006.01)
*B65B 53/00* (2006.01)
*C09K 15/04* (2006.01)
*C02F 1/70* (2006.01)

(52) U.S. Cl. ................. 252/188.28; 252/184; 252/383; 252/389.1; 252/389.53; 252/399; 252/181.1; 428/35.2; 428/35.8; 428/215; 428/219; 428/220; 428/35.9; 428/349; 428/516; 428/411.1; 426/133; 426/234; 426/238; 426/248; 426/392; 426/297; 426/398; 426/399

(58) Field of Classification Search ............. 252/188.28
See application file for complete search history.

(56) References Cited

U.S. PATENT DOCUMENTS

| | | | |
|---|---|---|---|
| 3,497,571 A | 2/1970 | Tellier et al. | |
| 3,536,687 A | 10/1970 | Nordstrom | |
| 4,415,710 A | 11/1983 | Barnabeo et al. | |
| 4,524,201 A | 6/1985 | Barnabeo et al. | |
| 5,034,235 A | 7/1991 | Dunn et al. | |
| 5,116,916 A | 5/1992 | Young | |
| 5,211,875 A | 5/1993 | Speer et al. | |
| 5,346,644 A | 9/1994 | Speer et al. | |
| 5,346,697 A | 9/1994 | Tokuyama et al. | |
| 5,350,622 A | 9/1994 | Speer et al. | |
| 5,425,896 A | 6/1995 | Speer et al. | |
| 5,425,953 A | 6/1995 | Sintov et al. | |
| 5,466,756 A | 11/1995 | Roach et al. | |
| 5,498,364 A | 3/1996 | Speer et al. | |
| 5,627,239 A | 5/1997 | Ching et al. | |
| 5,641,825 A | 6/1997 | Bacskai et al. | |
| 5,656,692 A | 8/1997 | Hayes | |
| 5,660,761 A | 8/1997 | Katsumoto et al. | |
| 5,700,554 A | 12/1997 | Speer et al. | |
| 5,736,616 A | 4/1998 | Ching et al. | |
| 5,776,361 A | 7/1998 | Katsumoto et al. | |
| 5,798,055 A | 8/1998 | Blinka et al. | |
| 5,814,304 A | 9/1998 | Wong et al. | |
| 5,820,852 A | 10/1998 | Burgess et al. | |
| 5,837,158 A | 11/1998 | Shepodd et al. | |
| 5,851,514 A | 12/1998 | Hassan et al. | |
| 5,859,145 A | 1/1999 | Ching et al. | |
| 5,904,960 A * | 5/1999 | Becraft et al. ................ 427/558 |
| 5,906,811 A | 5/1999 | Hersh | |
| 5,911,910 A | 6/1999 | Becraft et al. | |
| 5,941,037 A | 8/1999 | Hallock et al. | |
| 5,977,212 A | 11/1999 | Ebner et al. | |
| 6,057,013 A | 5/2000 | Ching et al. | |
| 6,063,307 A | 5/2000 | Shepodd et al. | |
| 6,228,347 B1 | 5/2001 | Hersh | |
| 6,255,248 B1 | 7/2001 | Bansleben et al. | |
| 6,259,107 B1 * | 7/2001 | Becraft et al. ........... 250/504 R |
| 6,287,653 B1 * | 9/2001 | Speer et al. ................ 428/35.4 |
| 6,333,087 B1 | 12/2001 | Jerdee et al. | |
| 6,406,644 B2 | 6/2002 | Jerdee et al. | |
| 6,449,923 B1 | 9/2002 | Cook et al. | |
| 6,491,896 B1 | 12/2002 | Rajaiah et al. | |
| 6,527,976 B1 | 3/2003 | Cai et al. | |
| 6,547,776 B1 | 4/2003 | Rodgers et al. | |
| 6,569,408 B1 | 5/2003 | Yue et al. | |
| 6,689,314 B2 * | 2/2004 | Bushman et al. .............. 422/24 |
| 6,818,150 B2 * | 11/2004 | Galland et al. ......... 252/188.28 |
| 2002/0017310 A1 | 2/2002 | Gruenbacher et al. | |
| 2002/0081358 A1 * | 6/2002 | Galland et al. .............. 426/398 |
| 2002/0086039 A1 | 7/2002 | Lee et al. | |

(Continued)

FOREIGN PATENT DOCUMENTS

EP    1020363 A2    7/2000

(Continued)

OTHER PUBLICATIONS

Ching et al., "Tasteless Oxygen Scavenging Polymers: A New Platform Technology for Food Packaging Based On Controlled Oxidation," *Oxygen Absorber ... 2001 and Beyond*, OSP Conference pp. 1-8 (Chicago, Jun. 19-20, 2000).

(Continued)

*Primary Examiner*—Joseph D Anthony
(74) *Attorney, Agent, or Firm*—Mark B. Quatt

(57) ABSTRACT

A method of triggering a film containing an oxygen scavenger includes providing composition including a peroxide; and packaging the composition in a film including an oxygen scavenger; whereby the oxygen scavenger is triggered in the absence of ultraviolet light, visible light, and electron beam radiation by exposure to the peroxide or an associated enriched oxygen environment.

10 Claims, No Drawings

U.S. PATENT DOCUMENTS

| | | | |
|---|---|---|---|
| 2002/0137728 A1 | 9/2002 | Montgomery | |
| 2003/0082113 A1 | 5/2003 | Rajaiah et al. | |
| 2003/0092596 A1 | 5/2003 | Veerman et al. | |
| 2003/0211050 A1 | 11/2003 | Majeti et al. | |
| 2004/0037789 A1 | 2/2004 | Moneuze et al. | |
| 2004/0062798 A1 | 4/2004 | Lukenbach et al. | |
| 2004/0081584 A1* | 4/2004 | Dayrit et al. | 422/79 |
| 2004/0099840 A1 | 5/2004 | Horsham et al. | |
| 2004/0258723 A1 | 12/2004 | Singh et al. | |
| 2005/0092963 A1* | 5/2005 | Galland et al. | 252/188.28 |
| 2005/0244665 A1* | 11/2005 | Rivett et al. | 428/500 |
| 2006/0276368 A1 | 12/2006 | Speer et al. | |

FOREIGN PATENT DOCUMENTS

| | | |
|---|---|---|
| JP | 2002088265 | 3/2002 |
| WO | WO 99/48963 A2 | 9/1999 |

OTHER PUBLICATIONS

Ching et al., "Tasteless Oxygen Scavenging Polymers: A New Platform Technology for Food Packaging Based On Controlled Oxidation," *Oxygen Absorber ... 2001 and Beyond*, OSP Cconference Slides, 20 pages (Chicago, Jun. 19-20, 2000).

European Search Report and Opinion, for EP patent application No. 0625293, completed Sep. 11, 2006 (5 pages).

USPTO Office Action mailed Sep. 12, 2007 (relating to U.S. Appl. No. 10/988,796, filed Nov. 15, 2004 (10 pages).

Rule 1.111 amendment filed Dec. 14, 2007 (relating to U.S. Appl. No. 10/988,796, filed Nov. 15, 2004 (13 pages).

Preliminary amendment filed Apr. 30, 2008 (relating to U.S. Appl. No. 10/988,796, filed Nov. 15, 2004 (8 pages).

* cited by examiner

METHOD OF TRIGGERING A FILM CONTAINING AN OXYGEN SCAVENGER

FIELD OF THE INVENTION

The invention relates to a method of triggering a film containing an oxygen scavenger.

BACKGROUND OF THE INVENTION

Peroxides such as hydrogen peroxide and carbamide peroxide are used in many products. US Patent Application Publication No. US 20020086039 (Lee et al.), incorporated herein by reference in its entirety, describes the use of peroxide in such products as cosmetic, personal care, cleaning agent, biocidal agent, functional food, and nutritional supplement compositions, antibacterial, antiseptic, antibiotic and first aid products, depilatory, epilatory and hair bleaching products, toothpaste products, mouthwash and mouth rinse products, contact lens treatment products, laundry detergent, stain remover, and fabric softening products. It is well known that the decomposition of peroxides produces a significant volume increase. It is well understood that the liquid form of hydrogen peroxide decomposes to produced a volume increase of 11.2 times the volume of gaseous oxygen, on a molar basis. It is also well known that the breakdown of peroxides is accelerated by various factors including heat, light (particularly UV light) and the presence of transition metals. Thus, as described in U.S. Pat. No. 5,814,304 (Wong et al.), incorporated herein by reference in its entirety, these peroxy compounds can have the undesirable effect of gas evolution that can cause the swelling and sometimes bursting of tubes containing a product having a hydrogen peroxide.

Oxygen scavengers are well known in packaging materials for use in packaging many oxygen sensitive products, including food products. Exemplary is U.S. Pat. No. 5,350,622 (Speer et al.)

U.S. Pat. No. 6,818,150 (Galland et al.) discloses a packaging article, such as a rigid container or flexible bag, having an oxygen scavenging polymer, and wetting the interior surface of the article with a solution containing a peroxide. The '150 patent requires that the wetted surface be exposed to an initiating factor in the form of ultraviolet light, heat at a certain minimum level of hydrogen peroxide, visible light at certain wavelengths, or electron beam radiation, to initiate the oxygen scavenging reaction.

SUMMARY OF THE INVENTION

The inventors have now found that an oxygen scavenger can be triggered by exposure to a peroxide, such as hydrogen peroxide present in a packaged product, and exposure to the associated enriched (hyperbaric) oxygen atmosphere in the package, without the need for, and in the absence of, activation with actinic radiation such as ultraviolet light, visible light, and electron beam radiation, or heat, to trigger the oxygen scavenging reaction. The presence and activation of the oxygen scavenger is useful in the packaging of compositions that contain a peroxide and as a result generate oxygen over time. The likelihood of explosion or expansion of the package is reduced, as the oxygen scavenger scavenges oxygen being given off by the natural degradation of the peroxide. Since peroxide decomposition can be accelerated by light, in one embodiment the package can be opaque to UV and/or visible light.

In a first aspect of the present invention, a method of triggering a film containing an oxygen scavenger comprises providing a composition comprising a peroxide; and packaging the composition in a film comprising an oxygen scavenger; whereby the oxygen scavenger is triggered in the absence of ultraviolet light, visible light, and electron beam radiation by exposure to the peroxide or an associated enriched oxygen environment.

In a second aspect of the present invention, a package comprises an oxygen scavenger film comprising a first layer comprising a material selected from the group consisting of metallized or pigmented polyester, polypropylene, polyamide, high density polyethylene, ethylene/vinyl alcohol copolymer, polytetrafluoroethylene, poly(vinyl chloride), cycloolefin copolymer, oriented poly(styrene), and ethylene/propylene copolymer; a second layer comprising ink, pigment or a metallized polymeric substrate, a third layer comprising an oxygen scavenger, and a fourth layer comprising an ethylene homopolymer or copolymer; and a product, contained in the package, comprising a peroxide; wherein the oxygen scavenger is capable of being triggered by the presence of the peroxide and/or an associated enriched oxygen environment, in the absence of ultraviolet light, visible light, and electron beam radiation.

In a third aspect of the present invention, a package comprises an oxygen scavenger film comprising a first layer comprising a material selected from the group consisting of metallized or pigmented polyester, polypropylene, polyamide, high density polyethylene, ethylene/vinyl alcohol copolymer, polytetrafluoroethylene, poly(vinyl chloride), cycloolefin copolymer, oriented poly(styrene), and ethylene/propylene copolymer; a second layer comprising an oxygen scavenger, and a third layer comprising an ethylene homopolymer or copolymer; and a product, contained in the package, comprising a peroxide; wherein the oxygen scavenger is capable of being triggered by the presence of the peroxide and/or an associated enriched oxygen environment in the package, in the absence of ultraviolet light, visible light, and electron beam radiation.

Definitions

An "associated enriched oxygen environment" herein means any atmosphere, inside a package, containing greater than 21% oxygen by volume, the atmosphere generated by the presence of a composition, in the package, comprising a peroxide.

A "composition comprising a peroxide" herein refers to any composition that comprises hydrogen peroxide or any organic or inorganic peroxide or hydroperoxide, or a percarbonate or perborate that liberates oxygen when wet.

"Oxygen scavenger", "oxygen scavenging", and the like herein means or refers to a composition, compound, film, film layer, coating, plastisol, gasket, or the like which can consume, deplete or react with oxygen from a given environment.

"Film" herein means a film, laminate, sheet, web, coating, or the like. The film can be used as a component in a rigid, semi-rigid, or flexible product, and can be adhered to a non-polymeric or non-thermoplastic substrate such as paper or metal.

"Polymer" and the like herein means a homopolymer, but also copolymers thereof, including bispolymers, terpolymers, etc.

"Polyester" herein includes copolyesters.

"Polyamide" herein includes copolyamides.

"Polypropylene" herein includes propylene copolymers such as propylene/ethylene copolymer.

High oxygen barrier films can be made from materials having an oxygen permeability, of the barrier material, less than 500 cm$^3$ O$_2$/m$^2$·day·atmosphere (tested at 1 mil thick and at 25° C. according to ASTM D3985), such as less than 100, less than 50 and less than 25 cm$^3$ O$_2$/m$^2$·day·atmosphere such as less than 10, less than 5, and less than 1 cm$^3$ O$_2$/m$^2$·day·atmosphere. Examples of polymeric materials with low oxygen transmission rates are ethylene/vinyl alcohol copolymer (EVOH), polyvinylidene dichloride (PVDC), vinylidene chloride/methyl acrylate copolymer, polyamide, amorphous polyamide and polyester.

Alternatively, metal foil or SiOx compounds can be used to provide low oxygen transmission and low moisture transmission rate properties to the container. Metallized foils can include a sputter coating or other application of a metal layer to a polymeric substrate such as high density polyethylene (HDPE), ethylene/vinyl alcohol copolymer (EVOH), polypropylene (PP), cavitated polypropylene, polyethylene terephthalate (PET), polyethylene naphthalate (PEN), and polyamide (PA).

Additionally, barrier properties of polymeric packaging materials can be enhanced by applying a non-polymeric, non-oxide, non-metallic barrier coating. One such technology uses a carbon deposition.

Alternatively, oxide coated webs (e.g. aluminum oxide or silicon oxide) can be used to provide low oxygen and low moisture transmission rate properties to the container. Oxide coated webs can include a coating or other application of the oxide, such as alumina or silica, to a polymeric substrate such as high density polyethylene (HDPE), ethylene/vinyl alcohol copolymer (EVOH), polypropylene (PP), polyethylene terephthalate (PET), polyethylene naphthalate (PEN), and polyamide (PA).

Also useful in the present invention are high aspect ratio particles that are dispersed in the polymer used to produce the wall of the container, or coatings containing high aspect ratio particles that are applied to the surface of a film. These coatings may be used on one of the exterior surfaces of the package, or they may be buried in the composition through processes such as lamination or subsequent coating processes. High aspect-ratio particles include, but are not limited to, nano-clays, silicas, mica, talc, and vermiculite.

High moisture barrier films can be made from materials having a moisture vapor transmission rate (MVTR) of less than 1.0 g·mm/m$^2$·day at 25° C., preferably less than 0.5 g·mm/m$^2$·day and more preferably less than 0.2 g·mm/m$^2$·day at 25° C. Materials such as high density polyethylene, cyclic olefin copolymers, polypropylene, PVDC, metal, metallized and metal oxide coated webs can thusly provide excellent moisture barrier properties.

"Ethylene/alpha-olefin copolymer" (EAO) herein refers to copolymers of ethylene with one or more comonomers selected from C$_3$ to C$_{10}$ alpha-olefins such as propene, butene-1, hexene-1, octene-1, etc. in which the molecules of the copolymers comprise long polymer chains with relatively few side chain branches arising from the alpha-olefin which was reacted with ethylene. This molecular structure is to be contrasted with conventional high pressure low or medium density polyethylenes which are highly branched with respect to EAOs and which high pressure polyethylenes contain both long chain and short chain branches. EAO includes such heterogeneous materials as linear medium density polyethylene (LMDPE), linear low density polyethylene (LLDPE), and very low and ultra low density polyethylene (VLDPE and ULDPE), such as DOWLEX™ or ATTANE™ resins supplied by Dow, ESCORENE™ or EXCEED™ resins supplied by Exxon; as well as linear homogeneous ethylene/alpha olefin copolymers (HEAO) such as TAFMER™ resins supplied by Mitsui Petrochemical Corporation, EXACT™ resins supplied by Exxon, or long chain branched (HEAO) AFFINITY™ resins supplied by the Dow Chemical Company, or ENGAGE™ resins supplied by DuPont Dow Elastomers.

"Trigger" and the like herein means that process whereby oxygen scavenging is initiated (i.e. activated), wherein after initiation the oxygen scavenging rate of the article is at least about 0.05 cc oxygen per day per gram of oxidizable organic compound for at least two days after oxygen scavenging is initiated.

All compositional percentages used herein are presented on a "by weight" basis, unless designated otherwise.

DETAILED DESCRIPTION OF THE INVENTION

An oxygen scavenger film for use in the invention can include multiple layers, dependent upon the properties required of the film.

Polymeric adhesives can be used in some embodiments of the present invention to adhere adjacent layers together, and can include e.g. ethylene/vinyl acetate copolymer; anhydride grafted ethylene/vinyl acetate copolymer; anhydride grafted ethylene/alpha olefin copolymer; anhydride grafted polypropylene; anhydride grafted low density polyethylene; ethylene/methyl acrylate copolymer; and anhydride grafted ethylene/methyl acrylate copolymer.

The Oxygen Scavenger

Oxygen scavengers suitable for commercial use in articles of the present invention, such as films, are disclosed in U.S. Pat. No. 5,350,622. This patent is incorporated herein by reference in its entirety. According to U.S. Pat. No. 5,350,622, oxygen scavengers are made of an ethylenically unsaturated hydrocarbon and transition metal catalyst. The ethylenically unsaturated hydrocarbon may be either substituted or unsubstituted. As defined herein, an unsubstituted ethylenically unsaturated hydrocarbon is any compound that possesses at least one aliphatic carbon-carbon double bond and comprises 100% by weight carbon and hydrogen. A substituted ethylenically unsaturated hydrocarbon is defined herein as an ethylenically unsaturated hydrocarbon which possesses at least one aliphatic carbon-carbon double bond and comprises about 50%-99% by weight carbon and hydrogen. Suitable substituted or unsubstituted ethylenically unsaturated hydrocarbons are those having two or more ethylenically unsaturated groups per molecule, e.g. a polymeric compound having three or more ethylenically unsaturated groups and a molecular weight equal to or greater than 1,000 weight average molecular weight.

Examples of unsubstituted ethylenically unsaturated hydrocarbons include, but are not limited to, diene polymers such as polyisoprene, (e.g., trans-polyisoprene) and copolymers thereof, cis and trans 1,4-polybutadiene, 1,2-polybutadienes, (which are defined as those polybutadienes possessing greater than or equal to 50% 1,2 microstructure), and copolymers thereof, such as styrene/butadiene copolymer and styrene/isoprene copolymer. Such hydrocarbons also include polymeric compounds such as polypentenamer, polyoctenamer, and other polymers prepared by cyclic olefin metathesis; diene oligomers such as squalene; and polymers or copolymers with unsaturation derived from dicyclopentadiene, norbornadiene, 5-ethylidene-2-norbornene, 5-vinyl-2-norbornene, 4-vinylcyclohexene, 1,7-octadiene, or other monomers containing more than one carbon-carbon double bond (conjugated or non-conjugated).

Examples of substituted ethylenically unsaturated hydrocarbons include, but are not limited to, those with oxygen-containing moieties, such as esters, carboxylic acids, aldehydes, ethers, ketones, alcohols, peroxides, and/or hydroperoxides. Specific examples of such hydrocarbons include, but are not limited to, condensation polymers such as polyesters derived from monomers containing carbon-carbon double bonds, and unsaturated fatty acids such as oleic, ricinoleic, dehydrated ricinoleic, and linoleic acids and derivatives thereof, e.g. esters. Specific examples also include esters or polyesters of functionalized unsaturated hydrocarbons such as hydroxy terminated polybutadiene. Such hydrocarbons also include polymers or copolymers derived from (meth)allyl (meth)acrylates. Suitable oxygen scavenging polymers can be made by trans-esterification. Such polymers are disclosed in U.S. Pat. No. 5,859,145 (Ching et al.) (Chevron Research and Technology Company), incorporated herein by reference as if set forth in full. The composition used may also comprise a mixture of two or more of the substituted or unsubstituted ethylenically unsaturated hydrocarbons described above. While a weight average molecular weight of 1,000 or more is beneficial, an ethylenically unsaturated hydrocarbon having a lower molecular weight is also usable, especially if it is blended with a film-forming polymer or blend of polymers.

An additional example of oxygen scavengers which can be used in connection with this invention are disclosed in PCT patent publication WO 99/48963 (Chevron Chemical et al.), incorporated herein by reference in its entirety. These oxygen scavengers include a polymer or oligomer having at least one cyclohexene group or functionality. These oxygen scavengers include a polymer having a polymeric backbone, cyclic olefinic pendent group, and linking group linking the olefinic pendent group to the polymeric backbone. An oxygen scavenger that has proven useful commercially is poly(ethylene/ methyl acrylate/ cyclohexene methyl acrylate) (abbreviated as EMCM).

An oxygen scavenging composition suitable for use with the invention comprises:

(a) a polymer or lower molecular weight material containing substituted cyclohexene functionality according to the following diagram:

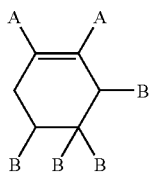

where A may be hydrogen or methyl and either one or two of the B groups is a heteroatom-containing linkage which attaches the cyclohexene ring to the said material, and wherein the remaining B groups are hydrogen or methyl;

(b) a transition metal catalyst; and (c) a photoinitiator.

The compositions may be polymeric in nature or they may be lower molecular weight materials. In either case, they may be blended with further polymers or other additives. In the case of low molecular weight materials, they will most likely be compounded with a carrier resin before use.

Also suitable for use in the present invention is the oxygen scavenger of U.S. Pat. No. 6,255,248 (Bansleben et al.), incorporated herein by reference in its entirety, which discloses a copolymer of ethylene and a strained, cyclic alkylene, preferably cyclopentene; and a transition metal catalyst.

Another oxygen scavenger which can be used in connection with this invention is the oxygen scavenger of U.S. Pat. No. 6,214,254 (Gauthier et al.), incorporated herein by reference in its entirety, which discloses ethylene/vinyl aralkyl copolymer and a transition metal catalyst.

Alternative oxygen scavengers that can beneficially be used in connection with the second and third aspects of the invention include ascorbate; isoascorbate; sulfite; sulfite exchanged hydrotalcite; ascorbate and a transition metal catalyst, the catalyst comprising a simple metal or salt, or a compound, complex or chelate of the transition metal; a transition metal complex or chelate of a polycarboxylic acid, salicylic acid, or polyamine; a tannin; or a reduced metal such as iron. Suitable oxygen scavenging hydrotalcite compositions are disclosed in U.S. Pat. No. 5,941,037, incorporated herein by reference in its entirety. Suitable reduced metal compositions are disclosed in U.S. Pat. No. 5,798,055, incorporated herein by reference in its entirety. Suitable ascorbate based oxygen scavenging compositions are disclosed in U.S. Pat. No. 5,977,212, incorporated herein by reference in its entirety. These inorganic oxygen scavengers can be advantageous in providing both oxygen scavenging capability and opacity.

An optimal package structure may contain more than one type of oxygen scavenger and/or more than one layer comprising an oxygen scavenger.

Transition Metal Catalysts

As indicated above, the ethylenically unsaturated hydrocarbon is combined with a transition metal catalyst. Suitable metal catalysts are those that can readily interconvert between at least two oxidation states.

The catalyst can be in the form of a transition metal salt, with the metal selected from the first, second or third transition series of the Periodic Table. Suitable metals include, but are not limited to, manganese II or III, iron II or III, cobalt II or III, nickel II or III, copper I or II, rhodium II, III or IV, and ruthenium II or III. The oxidation state of the metal when introduced is not necessarily that of the active form. Suitable counterions for the metal include, but are not limited to, chloride, acetate, stearate, palmitate, caprylate, linoleate, tallate, 2-ethylhexanoate, neodecanoate, oleate or naphthenate. Useful salts include cobalt (II) 2-ethylhexanoate, cobalt stearate, and cobalt (II) neodecanoate. The metal salt may also be an ionomer, in which case a polymeric counterion is employed. Such ionomers are well known in the art.

Any of the above-mentioned oxygen scavengers and transition metal catalyst can be further combined with one or more polymeric diluents, such as thermoplastic polymers, which are typically used to form film layers in plastic packaging articles. In the manufacture of certain packaging articles well known thermosets can also be used as the polymeric diluent.

Further additives can also be included in the composition to impart properties desired for the particular article being manufactured. Such additives include, but are not necessarily limited to, fillers, pigments, dyestuffs, antioxidants, stabilizers, processing aids, plasticizers, fire retardants, etc.

The mixing of the components listed above can be accomplished by melt blending at a temperature in the range of 50° C. to 300° C. However, alternatives such as the use of a solvent followed by evaporation may also be employed.

Photoinitiators

Some of the materials useful in connection with the invention include:
 1,3,5-tris(4-benzoylphenyl)benzene (BBP$^3$)
 isopropylthioxanthone (ITX)
 bis(2,4,6-trimethylbenzoyl)phenylphosphineoxide (IRGACURE® 819)

2,4,6-trimethylbenzoyldiphenylphosphine oxide
ethyl-2,4,6-trimethylbenzoylphenyl phosphinate
bis(2,6-dimethoxybenzoyl)-2,4,4-trimethylpentyl phosphine oxide
4,4'-benzoylmethyl diphenyl sulfide (BMS)

The amount of photoinitiator can depend on the amount and type of unsaturation present in the polymer, the wavelength and intensity of radiation used; the nature and amount of antioxidants used; and the type of photoinitiator used.

EXAMPLES

Example 1

A representative film structure in accordance with the invention is identified below.

| PET | Print layer | metallized polymeric substrate | OSL | PE |
|---|---|---|---|---|
| 0.48 mils | | 0.50 mils | 0.75 mils | 0.25 mils |

The total gauge of the film is 1.98 mils, with the thickness of each layer, in mils, as indicated above. The print layer is an optional layer, and in one embodiment is reverse printed onto the PET layer.

"PET" herein is poly(ethylene terephthalate), although another suitable polyester or copolyester can be used.

The polymer for the metallized layer can be e.g. polypropylene or polyamide, including biaxially oriented polypropylene (BOPP) and polyamide (BON).

The OSL is the oxygen scavenging layer, and includes one or more of the oxygen scavengers disclosed herein.

"PE" is an ethylene homopolymer, such as low density polyethylene, or an ethylene copolymer such as an ethylene/alpha olefin copolymer.

"PS" is polystyrene or styrenic copolymer.

The various layers can be adhered together by lamination, such as adhesive lamination, or any other suitable means.

The PE layer can comprise, instead of EAO, a propylene polymer or copolymer, such as ethylene/propylene copolymer, or an ethylene copolymer such as ethylene/vinyl acetate copolymer, or ethylene/acrylic or methacrylic acid copolymer, or ionomer resin.

Additional materials, including polymeric materials or other organic or inorganic additives, can be added to any or all of the layers of the above structures as needed, and additional film layers can be included either within the film structure, or adhered to an outer layer thereof.

Film as described herein can be produced by any suitable method.

The PE layer can act as a sealant that will adhere to itself upon the application of heat sealing or alternative sealing techniques, to form a package containing the composition, or can alternatively be adhered by adhesive or other suitable means to another polymer, to paperboard, or to foil such as metal foil.

Films useful in connection with the invention can have any suitable number of layers, such as a total of from 2 to 20 layers.

In general, the film can have any total thickness desired, and each layer can have any thickness desired, so long as the film provides the desired properties for the particular packaging operation in which the film is used. Typical total thicknesses are from 0.5 mils to 15 mils, such as 1 mil to 12 mils, such as 2 mils to 10 mils, 3 mils to 8 mils, and 4 mils to 6 mils.

Package Formats

A package of the invention can take the form of a pouch or container in which the film structure of the invention surrounds and packages a peroxide composition as described herein. The PE layer can function as a sealant layer, and can be sealed to itself as shown in the "X" regions of the package schematically shown here. The composition can be supported on a suitable substrate or support.

Example 2

| | | |
|---|---|---|
| | PET | |
| | PRINT | |
| | METALLIZED POLYMER | |
| | OSL | |
| | PE | |
| XXXXXXX | PEROXIDE COMPOSITION | XXXXXXX |
| | PE | |
| | OSL | |
| | METALLIZED POLYMER | |
| | PRINT | |
| | PET | |

Example 3

Alternatively, the peroxide composition can be disposed on a suitable substrate, made from metal, polymer, metallized foil, or any suitable material or combination of materials. The peroxide composition can be covered with a film of the invention, as shown in the following:

| |
|---|
| PET |
| PRINT |
| METALLIZED POLYMER |
| OSL |
| PE |
| PEROXIDE COMPOSITION |
| SUBSTRATE |

Alternatively, the structures of examples 2 and 3 may be surface printed and may further comprise an overprint varnish.

Example 4

In another alternative, the peroxide composition can be disposed inside a tube. The film of the invention can form the tube, or an interior part of the tube, such that
1. the oxygen scavenger in the film is triggered by the peroxide in the composition; and
2. oxygen that evolves from the breakdown of the peroxide in the composition can be scavenged by the now triggered oxygen scavenger of the film The peroxide composition of the method and package of the invention can have from 0.5% to 25%, such as from 1% to 20%, 3% to 18%, 4% to 16%, and 5% to 10% by weight of the composition, of a peroxide. The peroxide can be any suitable peroxide, such as hydrogen peroxide, carbamide peroxide, sodium peroxide carbonate, or any organic or inorganic peroxide or hydroperoxide as well as percarbonates and perborates that liberate oxygen when wet.

Some types of oxygen scavengers will discolor when incorporated in a film and triggered by hydrogen peroxide. This color change is beneficially masked to avoid producing an aesthetically unattractive package. The additional examples below include a colored layer for this purpose. The color can be provided by any well known coloring agents, which can be premixed into a polymer host that is then extruded as a layer. In Example 7, the coloring agent is included in one or more of the polymers making up the oxygen scavenger layer. In Example 8, the coloring agent is included in the polymer, or one or more of the polymers, making up the PE layer.

In some of the examples, a bulk layer is present. This layer can comprise any suitable polymer, or blend thereof, and serves to contribute to the abuse resistance, rigidity, or other physical properties of the film.

The narrow double vertical lines in these Examples indicates that the PET is laminated by adhesives or otherwise to a multilayer polymeric film as described. The multilayer film can be produced by e.g. coextrusion, extrusion coating, extrusion lamination, or lamination techniques, or any other suitable technique well known in the art.

Any of the example structures below could be printed on the PET surface and may further comprise an overprint varnish.

Example 5

| PET | Bulk Layer | OSL | Colored Layer | PE |
|---|---|---|---|---|

Example 6

| PET | Colored Layer | OSL | PE |
|---|---|---|---|

Example 7

| PET | Bulk Layer | Colored OSL | PE |
|---|---|---|---|

Example 8

| PET | Bulk Layer | OSL | Colored PE |
|---|---|---|---|

The PET in these structures may be metallized or PVDC coated to provide barrier to light, oxygen and moisture. If transparent barrier PET is used the one or more of the other layers of the structure can provide the desired opacity to UV and/or visible light.

Example 9

| Substrate | O$_2$ Barrier | Bulk Layer | OSL | PE |
|---|---|---|---|---|

The substrate comprises oriented or unoriented PA, PP, PET, or PS.

O$_2$ barriers can comprise PVDC, aluminum (or other metals), oxides, nanoclay coatings, EVOH, acrylonitrile containing polymers with these materials being coatings applied to the substrate via melt coating or deposition processes, or as layers applied via coextrusion.

Example 10

| BOPP | Bulk Layer | OSL | PE |
|---|---|---|---|

The BOPP layer may be metallized, or PVDC coated to provide barrier to light oxygen and moisture. If transparent barrier BOPP is used the one or more of the other layers of the structure will provide the desired opacity to UV and/or visible light. The structure can be printed on the BOPP surface and may further comprise an overprint varnish.

Example 11

| BON | Bulk Layer | OSL | PE |
|---|---|---|---|

The biaxially oriented nylon (BON) layer may be metallized, or PVDC coated to provide barrier to light oxygen and moisture. If transparent barrier BON is used the one or more of the other layers of the structure will provide the desired opacity to UV and/or visible light. The structure can be printed on the BON surface and may further comprise an overprint varnish.

The invention is not limited to the illustrations described herein, which are deemed to be merely illustrative, and susceptible of modification of form, size, arrangement of parts and details of operation. For example, an alternative method for providing an opaque layer, i.e. a layer opaque to UV and/or visible light, is to provide a layer comprising an incompatible blend, that is, a blend of resins that results in relatively high haze values; or to provide a polymeric layer that is cavitated; or to provide a foamed polymeric layer.

What is claimed is:
1. A method of triggering a film containing an oxygen scavenger comprising:
   a) providing a composition comprising a carbamide peroxide or an inorganic peroxide wherein the composition comprises a product having said peroxide therein, and in which oxygen evolves from the breakdown of said peroxide present in the product; and
   b) packaging the composition in a film comprising an oxygen scavenger;

whereby the oxygen scavenger is triggered in the absence of ultraviolet light, visible light, and electron beam radiation by exposure to said peroxide or an associated enriched oxygen environment.

2. The method of claim 1 wherein the oxygen scavenger comprises:
   a) an organic oxygen scavenger,
   b) a transition metal catalyst, and
   c) a photoinitiator.

3. The method of claim 2 wherein the wherein the organic oxygen scavenger comprises one or more material selected from the group consisting of
   i) ethylenically unsaturated hydrocarbon,
   ii) a polymer having a polymeric backbone, cyclic olefinic pendent group, and linking group linking the olefinic pendent group to the polymeric backbone,
   iii) a copolymer of ethylene and a strained, cyclic alkylene, and
   iv) ethylene/vinyl aralkyl copolymer.

4. The method of claim 1 wherein the composition comprises from 0.5% to 25%, by weight of the composition, peroxide.

5. The method of claim 1 wherein the average oxygen scavenging rate of the film is at least 25 $cc/m^2/day$ for at least two days after the oxygen scavenging property of the film is triggered.

6. The method of claim 1 wherein at least one layer of the film is cross-linked.

7. The method of claim 1 wherein the film is solid state oriented.

8. The method of claim 1 wherein the film is heat shrinkable.

9. The method of claim 1 wherein the peroxide comprises hydrogen peroxide.

10. The method of claim 1 wherein the film comprises:
    i) a first layer comprising a material selected from the group consisting of metallized or pigmented polyester, polypropylene, polyamide, high density polyethylene, ethylene/vinyl alcohol copolymer, polytetrafluoroethylene, poly(vinyl chloride), cycloolefin copolymer, oriented poly(styrene), and ethylene / propylene copolymer;
    ii) a second layer comprising ink, pigment or a metallized polymeric substrate;
    iii) a third layer comprising an oxygen scavenger, and
    iv) a fourth layer comprising an ethylene homopolymer or copolymer.

* * * * *